United States Patent [19]
Schindler et al.

[11] 3,740,451
[45] June 19, 1973

[54] MOLDED ELECTRICAL JUNCTION BOX

[75] Inventors: Edgar C. Schindler, Seattle; John C. McEachron, Tacoma, both of Wash.

[73] Assignee: Nelco Corporation, Kent, Wash.

[22] Filed: June 22, 1972

[21] Appl. No.: 265,342

Related U.S. Application Data

[62] Division of Ser. No. 69,266, Sept. 3, 1970, Pat. No. 3,701,451.

[52] U.S. Cl. .................. 174/58, 220/3.2, 264/334
[51] Int. Cl. ............................................. H02g 3/12
[58] Field of Search ............... 174/53, 54, 55, 56, 174/57, 58; 220/3.2, 3.3, 3.4, 3.5, 3.6; 264/334

[56] References Cited
UNITED STATES PATENTS
3,176,869  4/1965  Kinney ........................... 174/58 X Primary Examiner—Bernard A. Gilheany
Assistant Examiner—D. A. Tone
Attorney—Christensen & Sanborn

[57] ABSTRACT

An electrical junction box characterized by the provision of knockouts provided in the walls of the outlet box which are accessible from the interior of the box for easy removal. The junction box, which is constructed of an injection moldable resinous material having insulating properties, is provided with tapered ribs on the exterior surface of the side walls to properly orient the box with respect to the wall yet provide sufficient draft angle to enable injection molding. Additional volume on the interior of the electrical outlet box is provided by a lateral extension of the box constructed and arranged to fit within the wall structure. Grounding means for use with the boxes is provided wherever necessary.

2 Claims, 18 Drawing Figures

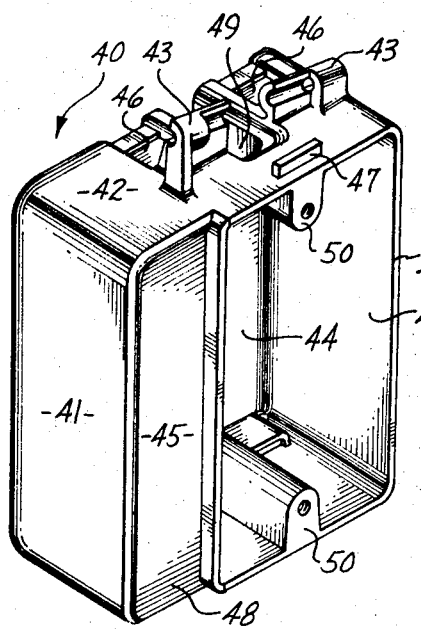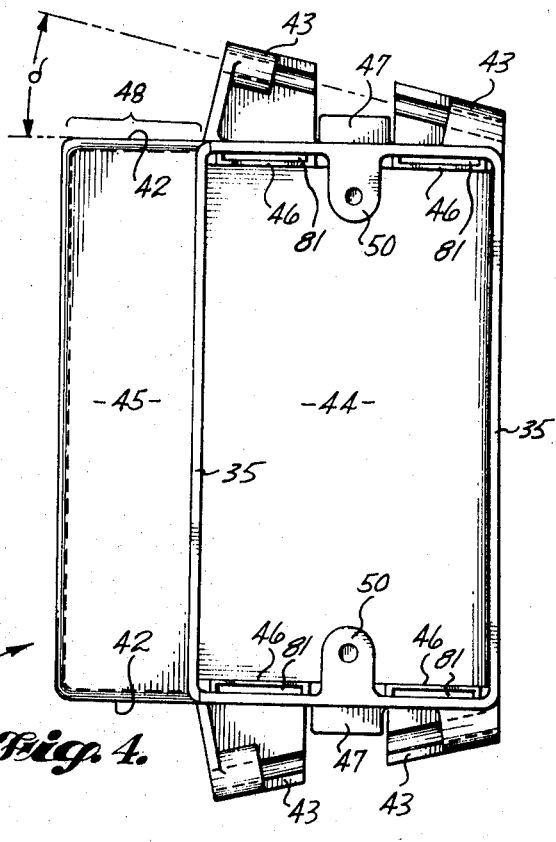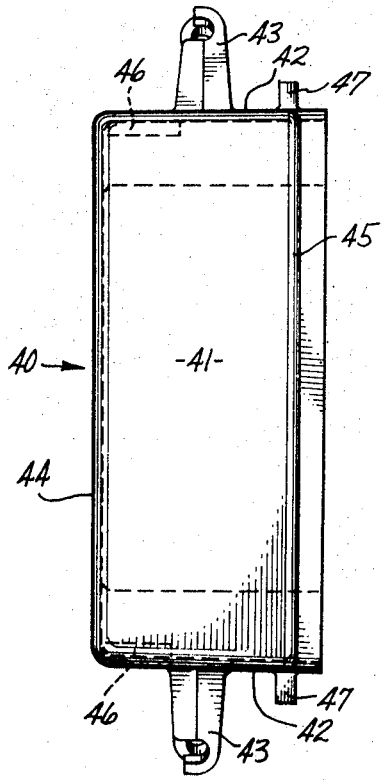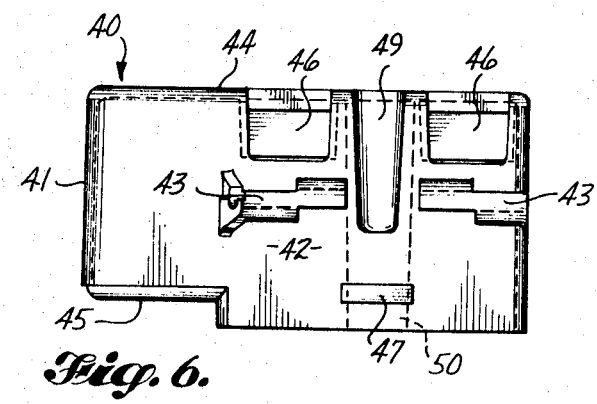
Fig. 3.
Fig. 4.
Fig. 5.
Fig. 6.

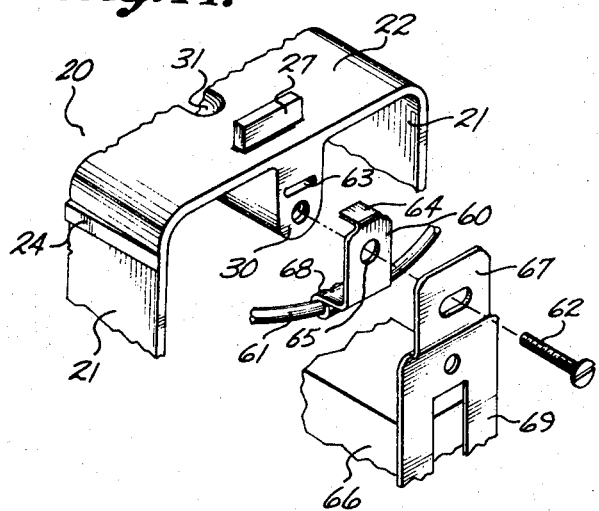
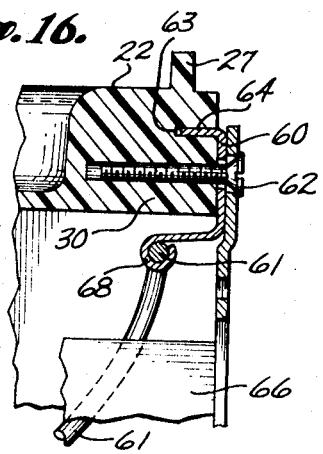
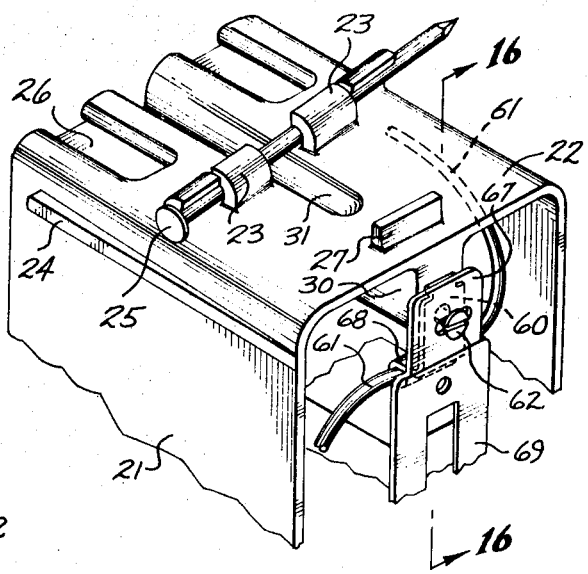
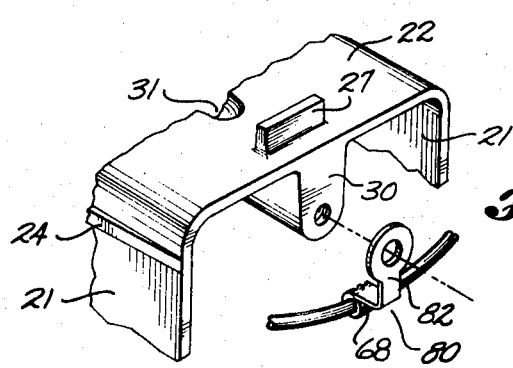

MOLDED ELECTRICAL JUNCTION BOX

This application is a division of application Ser. No. 69,266 filed Sept. 3, 1970, now U.S. Pat. No. 3,701,451.

BACKGROUND OF THE INVENTION

This invention relates to junction boxes and electrical outlet boxes constructed of a material having insulating properties, and to grounding means for use with such boxes.

This invention further relates to molded electrical junction boxes made of an insulating material which have a plurality of knockouts designed to be readily removable from the interior of the box.

PRIOR ART

Junction boxes of the general type with which the invention herein is concerned are usually rugged die-cast aluminum housings having a number of wall segments which may be removed by impact or manipulation with tools from the outside of the box. It is usually very difficult to remove these knockouts from the interior of the box since no means is provided for ready manipulation and access from the interior. Other types of outlet boxes are known to the prior art in which plastic materials are molded into an open topped receptacle; however, the knockout segments provided in these devices suffer similarly from the problem of inaccessibility from the interior of the box. Thus, whenever the outlet or junction box is installed in a wall, it is very difficult to open one of the knockout segments to provide access to the interior of the box without either doing a great deal of damage to the adjacent wall materials or completely removing the outlet box from the wall. The junction boxes with which this invention is concerned are intended to enable the mounting of a variety of electrical applicances, such as switches, electrical receptacles and convenience outlets.

Mounting the devices of the prior art to structural members in the wall has presented several problems. The first problem encountered involves the manufacture and construction of the electrical junction box. The mounting apparatus has presented some problems with regard to the injection molding techniques necessary to form the mounting apparatus as a part of the injection molded electrical outlet box. The prior art devices, while providing for the attachment of the device to the structural member, have resulted in fabrication difficulties due to mold release problems. One alternative has been to provide a separate mounting bracket to be nailed to the structural member and to which the box is then attached by screws or bolts.

OBJECTS OF THE INVENTION

It is an object of this invention to provide a molded electrical outlet box constructed of a lightweight and inexpensive material which is easy to manufacture. A releated object of this invention is to provide an open-topped molded insulation wiring box which may be constructed utilizing injection molding techniques.

One primary object of the present invention is to provide an electical outlet box having insulating properties which has a fastening bracket molded as an integral part thereof and with which standard nails may be used for fastening the outlet box to structural members.

A further object of this invention is to provide an electrical outlet box having knockouts accessible from the interior of the box so that the knockouts may be readily removed from the interior of the box using tools normally aVailable to the electrician. A related object of this invention is to provide a knockout structure which presents a smooth-edged opening to any conductors placed therein after the knockout blank has been removed.

A still further object of this invention is to provide an electrical outlet box having means to ground appliances placed therein such that the outlet box itself may be used for either grounded or non-grounded electrical apparatus.

One specific object of this invention is to provide an electrical outlet box for thin-wall construction having a sufficient volume to meet the standards set up by governmental codes, yet which has a standard-sized opening.

Accordingly, this invention provides an electrical outlet or junction box which may be constructed of a plastic or other suitable insulating material which can be molded into the desired shape. Opposing side walls carry a pair of fastener ears through which standard nails may be placed to secure the outlet boxes to a structural member in a wall. Tapered ribs are provided adjacent the dihedral corners of the box to compensate for the draft angle of the box side walls. The draft angle is provided in the design of the injection molded box to facilitate molding. The ribs are positioned on the side walls of the box to engage the structural members of the wall and cause the front face of the box to be positioned in the plane of the wall into which the box is installed.

Knockouts are positioned in the side walls of the box. The knockouts are constructed so that they may be removed and conductors inserted into the box after the box has been installed in a wall. The knockouts are molded into the side of the junction box in such a manner that they may be removed from the inside of the box by insertion of the blade of a screwdriver or similar tool into an exposed slot on the interior of the box and twisting the screwdriver to break the portion of the knockout which covers the aperture. The knockout is molded in a thin section so that it will fracture readily, yet maintain adequate strength to close the aperture in those instances in which the knockout is not removed.

The outlet box of this invention can be provided with an offset extension for use with a shallow depth or thin-wall type construction so that while a single modular opening can be utilized, the interior volume of the box may equal the electrical code requirements. This is accomplished by providing a protrusion from the side of the box extending into the interior of the wall structure.

A grounding mechanism is provided with the injection molded junction boxes which may be inserted into the box to ground any appliance to be used with the box. The removable grounding mechanism permits the use of the junction box described herein interchangeably in applications in which grounding of the appliance is necessary and applications in which no grounding device is required.

These and other objects and advantages of this invention will become more readily apparent by an evaluation of the description of several preferred embodiments of this invention as set out below with particular reference to the attached drawings.

IN THE DRAWINGS

FIG. 3 shows an upper perspective view of one embodiment of this invention which is suitable deep-wall use in thin-wall construction such as mobile homes and the like;

FIG. 4 is a front view of the device shown in FIG. 3;

FIG. 5 is a side view of the device shown in FIG. 3;

FIG. 6 is an end view of the device shown in FIG. 3;

FIG. 14 shows one type of grounding mechanism suitable for use with the various embodiments of this invention;

FIG. 15 is a perspective view of the apparatus shown in FIG. 14 in assembled position;

FIG. 16 is a partial cross-sectional view of the apparatus shown in FIG. 15 taken along lines 16 — 16 in FIG. 15;

FIG. 17 shows a second embodiment of the grounding means utilized in this invention; and, FIG. 18 shows a third embodiment of the grounding means utilized in this invention.

Figure 1:
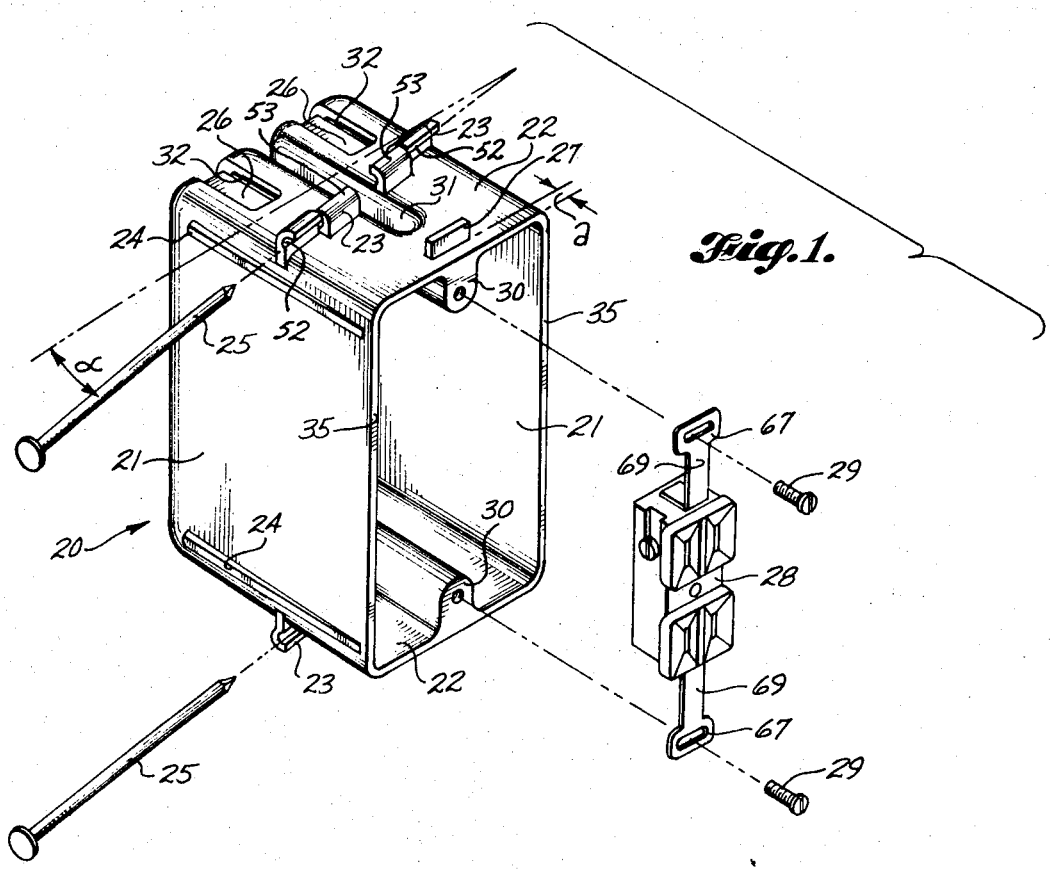
FIG. 1 shows an exploded perspective view of one embodiment of this invention which is a drop-wall style outlet or junction box suitable for standard building applications.

Referring more particularly to the drawings, wherein like numerals indicate like parts, there is seen in FIG. 1 an outlet box indicated generally at 20 which is of the deep-wall style having a standard size aperture defined by front face 35 into which an appliance such as the convenience outlet 28 may be inserted. The deep-wall molded junction box 20 has side walls 21, end walls 22 and a plurality of knockout elements 26 placed in the end walls 22. A pair of fastener ears 23 are molded as an integral part of each end wall 22 and provide means for attaching the box to a structural member by use of nails 25. The fastener ears 23 are set at an angle $\alpha$ with respect to the rear wall of the junction box 20 to permit easier access in nails 25 for nailing the box to the structural member. A threaded lug member 30 is molded into each end wall 22 and the ridge formed thereby extends completely through to the back wall 39. A slot 31 extends partially along the exterior of side wall 22 and serves to decrease the amount of plastic necessary to form the box while permitting the box to be formed by injection molding techniques. The threaded lug member 30 must extend completely to the back wall 39 of the box 20 to permit release of the box from the mold. A depth guide 27 is provided on each end wall to insure that the front face 35 of the box is flush with the outer surface of the wall board or panelling used on the wall.

Figure 2:
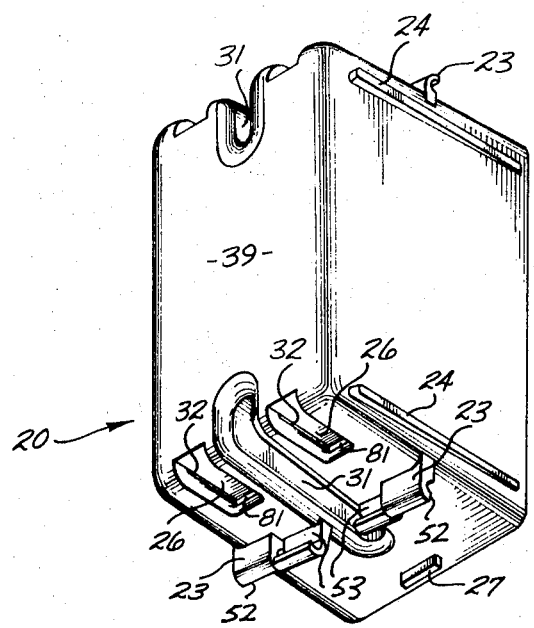
FIG. 2 shows a bottom perspective view of the device shown in FIG. 1.

An important feature of this invention is to provision of the tapered ribs 24 along the outer portion of ths side walls 21 of the deep-wall molded junction box. Ribs 24 are provided to properly orient the side wall of the box so that the front wall 35 will be precisely perpendicular to the structural member to which the box is attached. It is necessary to provide the tapered ribs 24 so that the injection molding techniques well known in the art may be utilized to form the box. A draft angle equivalent to the angle $\gamma$ must be imparted to the side walls in order to insure release of the box from the mold. The tapered ribs 24 thus are formed in the side walls 21 of the boxes 20 so that adjacent the front wall 35 the ridge is flush with the surface of side wall 21. Extending toward the rearward portion of the box the width of the rib 24 increases so that the upper surface of rib 24 remains perpendicular to the front face 35, and thus extends at the angle $\gamma$ with respect to side wall 21. The tapered ribs 24 are particularly useful in the deep-wall molded junction box 20 as shown in FIGS. 1 and 2. However it may be used in all embodiments of this invention if desired.

An appliance such as the convenience outlet 28 may be readily connected to wires extending into the interior of the box through knockouts 26 and the appliance then pushed back into contact with the threaded lug member 30 with screw 29 threadably engaging the interior of threaded lug member 30. The ears 67 of convenience outlet 28 are engaged by screw 29 to firmly hold the convenience outlet 28 in its proper position within the box 20.

Figure 10:
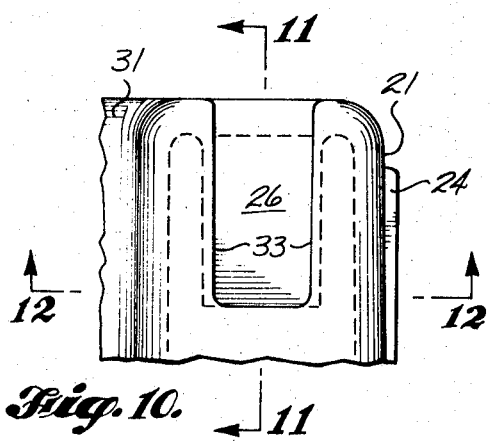
FIG. 10 is a partial plan view of one of the knockouts used in the device shown in FIG. 1.
Figure 11:
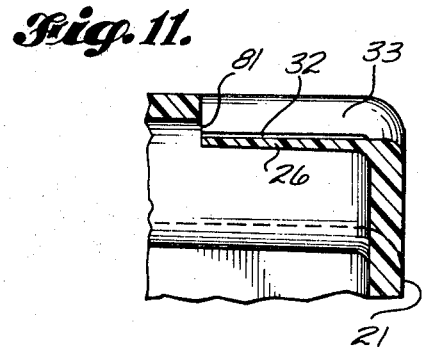
FIG. 11 is a partial cross-sectional view of the knockout area shown in FIG. 10 taken along lines 11 — 11 of FIG. 10.
Figure 12:
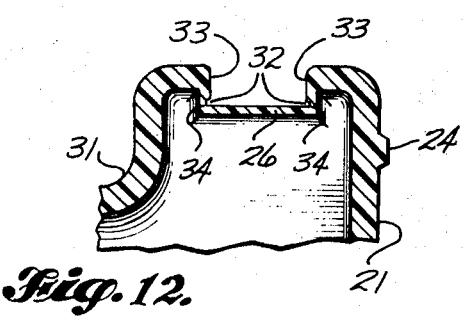
FIG. 12 is a partial cross-sectional view of the knockout area shown in FIG. 10 taken along lines 12 — 12 of FIG. 10.
Figure 13:
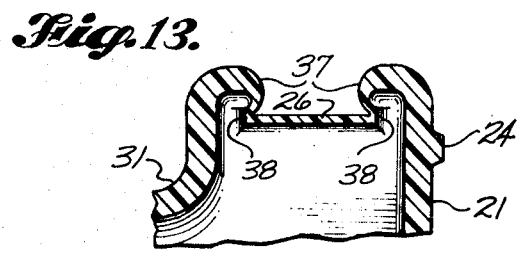
FIG. 13 is a cross-sectional view of a second embodiment of the knockout shown in FIGS. 10 – 12.

The knockout sections 26 are thin molded sections constructed of the same material as makes up the rest of the box 20 and are formed with an aperture 81 opening into the interior of the box. The aperture 81 is formed so that the blade of a screwdriver may be inserted into the aperture and the knockout 26 removed by twisting the blade of the screwdriver to fracture the thin segment of plastic material. A recess 32 extending along the sides of knockouts 26 defines one wall of a very thin frangible member 34 which may be readily shattered by the twisting force of a screwdriver blade in aperture 81. In FIGS. 10, 11 and 12 the details of the knockouts 26 and the surrounding structure of box 20 is shown in detail. The straight entry port wall 33 presents a smooth surface to any conductor entering the box to eliminate the possibility of severing or otherwise injuring the insulation thereon. The recesses 32 along the sides of the straight entry port wall 33 insure that no jagged edges will be presented to the conductor inserted through knockout 26 after removal of the knockout blank.

The deep-wall molded junction box 20 is provided with end wall nail guides 23 which are inclined at the angle $\alpha$ with respect to the front face 35 to facilitate installation of the outlet box in a standard wall construction. Angling the nail holders 23 with respect to the front wall 35 gives easy access to the nails or other fasteners being used to hold the outlet box 20 to the wall studs. The fastener ears 23 are molded integrally with the junction box and are designed to accept a standard nail or other fastener. The fastener ears 23 are constructed by molding a forward facing portion 52 and a rearward facing portion 53 by injection molding techniques well-known in the art.

The deep-wall molded junction box 20 may be utilized in any situation in which two-by-four timbers or similar structural elements serve as the structural supports for the walls. Adequate volume to meet the standards specified in the various applicable building codes can readily be provided in the interior of the box 20 whenever there is adequate room for this style of box in the wall structure. The box 20 can of course be made in double or triple widths to accommodate gangs of switches or a plurality of convenience outlets or other types of electrical apparatus, switching gear and the like, which are to be mounted in the interior of a wall.

Whenever the construction techniques utilized require a thin wall type construction, adequate volume to meet the requirements of the electrical codes frequently cannot be attained utilizing the shape of outlet box shown in FIGS. 1 and 2. To meet this problem, a second embodiment of this invention, as shown in FIGS. 3 through 6, was devised to permit an adequate volume on the interior of the box yet maintain the single standard width opening. In FIGS. 3 through 6, a shallow-wall molded junction box 40 is shown in various views. This box 40 is made up of a pair of side walls 41, a pair of end walls 42, a rear wall 44 and a covered or lanai section 48. The lanai section 48 of the box is necessary to increase the interior volume of the box to code standards while permitting installation of the box in a thin-walled structure. The lanai section 48 has a lanai cover 45 which may be molded as a separate piece and snapped into place into the injection molded box 40 to cover the lanai section 48 and reduce the size of the open area on the face of the box to a standard opening. A pair of threaded lug members 50 are disposed within the interior of the shallow-wall molded junction box 40 and are molded as an integral part of the end walls 42. The molding which forms the threaded lug member 50 extends through to the back wall 44 of the box 40 but has a portion of the plastic material removed from the outside to form slot 49 in the exterior of the end walls 42. The threaded lug members are adapted to receive appliances such as the convenience outlet 28 shown in FIG. 1.

On each end of the shallow wall molded junction box 40 a pair of canted fastener ears 43 are attached to permit nailing of the junction box to a support member. The canted fastener ears 43 are positioned on the end walls of box 40 at an angle δ thereto so as to facilitate the nailing of the box to a structural member without danger of injury to the box from a hammer blow. The canted fastener ears 43 are molded as a part of the end walls 42 and are structured so that injection molding techniques may be utilized with easy release of the formed box from the mold.

Figure 7:
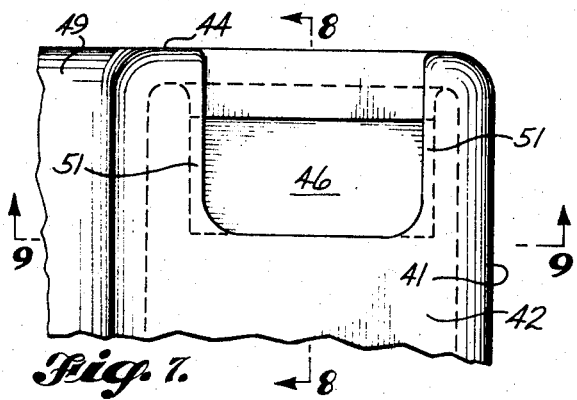
FIG. 7 is a partial plan view of the knockouts utilized in the device shown in FIG. 3.
Figure 8:
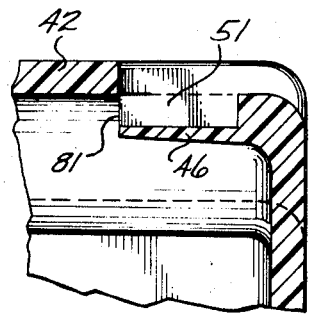
FIG. 8 is a partial cross section of the knockout area shown in FIG. 7 taken along lines 8 — 8.
Figure 9:
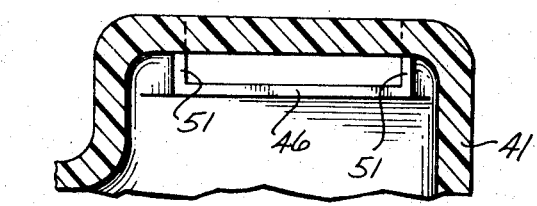
FIG. 9 is a partial cross section of the knockout area shown in FIG. 7 taken along lines 9 — 9 of FIG. 7.

A pair of knockouts 46 are also located in each end wall 42 and can be removed from the interior of the box by inserting a screwdriver tip into the aperture 81 and twisting the screwdriver as described above for the embodiment of this invention shown in FIGS. 1 through 3. The structure of the knockouts used in this embodiment of the invention may best be ascertained by reference to FIGS. 7 through 9 which show the knockout sections 46 and the surrounding plastic material in detail. During removal of the knockout 46, the frangible sections 51 are broken and the knockout itself is broken close to the base of the box 40 to permit insertion of a conductor into the box without presenting any rough or jagged edges which might injure the insulation on the exterior of the conductor.

The shallow-wall molded junction box 40 is provided with a pair of depth guides 47 attached to each end wall 42 of the box 40. These depth guides 47 are so located that plasterboard, panelling or other wall material may be situated around the face of the outlet box to a depth which causes the front face 35 to be flush with the outer surface of the panelling material. The depth guides 47 are so located that the lanai cover 45 may be covered by the panelling material leaving only the opening exposed for access to the interior of the box. The lanai cover 45 has an offset of an equivalent distance to that of the depth guides so that the panelling material may be placed on top of the lanai cover 45.

For many applications of either the deep wall molded junction box 20 or the shallow wall molded junction box 40, a grounding means is necessary to meet the standards of various electrical codes. Furthermore, for safety purposes, it is advisable to have switches, convenience outlets and other appliances grounded to prevent injury to the user through electrical shock. FIGS. 14 through 18 show various embodiments of grounding devices useful with this invention. In FIG. 14 one preferred embodiment of the grounding device is shown in which a lipped grounding clip 60 is utilized to provide an earth or ground to the switch body 66. This grounding mechanism, which is shown in conjunction with the deep-wall molded junction box 20, comprises a piece of flat metallic material which encircles a grounding wire conductor 61 at crimp 68. The lipped grounding clip 60 has a screw aperture 65 through which screw 62 is passed to fasten the switch body to the outlet 20. A lip 64 extends perpendicularly from the main body of the lipped grounding clip and is inserted into slot 63 for assembly. An interference fit may be provided between lip 64 and slot 63 to assist in assembling the apparatus. In FIGS. 16 and 17 the grounding clip is shown in its operative position with the switch body 66 engaging the grounding mechanism at ear 67 to provide a secure ground contact between the switch plate 69 and a remote ground. The grounding clip and switch mechanism is assembled by first placing the lip 64 into the slot 63 and engaging the grounding clip 60 with ear 67. Screw 62 is then passed through the apertures in both ear 67 and grounding clip 60 into the threaded lug member 30.

A second embodiment of the grounding clip is shown in FIG. 17. In this embodiment a spring-type grounding clip 70 having a pair of tongues 71 and 75 and a grounding tab is provided to engage the grooves 72 and 73 cut into the sides of threaded lug member 30. This embodiment of the grounding clip is readily assembled prior to placing the appliance in the junction box and a contact for grounding purposes is established between tab 71 and the ear 67 of a convenience outlet or similar electrical appliance. A third embodiment of the grounding apparatus is shown in FIG. 18 and merely comprises a lug-type grounding clip 80 which is securely attached to a grounding wire 61 at crimp 68. The appliance is held in place by screw member 62 and a secure ground is established by attaching the end of grounding wire 61 to the appliance in a manner well known in the art.

The materials of construction which may be utilized in this invention include any of the normally utilized injection moldable plastics such as phenolic resins and the like. It is particularly desirable to utilize a material which has good mold release characteristics since the intricate shapes necessary to mold the junction box of this invention may result in the adherence of the mold to the material unless the proper material is used. However, the design of this box results in several desirable design features which enhance the mold release characteristics. For example, the provision of the ridges adjacent the dihedral corners of the junction box permit a larger draft angle to be molded into the box than was previously thougt to be desirable or possible. The nailing means with which the box is attached to structural members is also designed for simple mold release with adequate structural strength to hold the box in its proper position.

While the present invention has been described with particular reference to specific examples, it will be apparent to those skilled in the art that various changes and modifications may be made thereto.

What is claimed is:

1. An electrical junction box having a wall structure defining a plurality of front-to-rear walls which terminate in a common frontal plane of the box and are interconnected with one another to define a chamber within the box that opens to the ambient surroundings of the box through the frontal plane thereof, a pair of which front-to-rear walls are oppositely disposed to one another and taper relatively toward one another in the direction relatively rearwardly away from the frontal plane of the box, and have corresponding laterally outstanding ribs thereon which extend in the front-to-rear direction of the box and define a pair of flat surfaces thereon that are disposed in spaced parallel planes extending perpendicular to the frontal plane of the box.

2. An electrical junction box according to claim 2 wherein there is a pair of spaced ribs on each of the oppositely disposed front-to-rear walls of the structure.

* * * * *